C. R. SHORT.
HYDROCARBON MOTOR.
APPLICATION FILED JUNE 11, 1917.
1,393,914.
Patented Oct. 18, 1921.
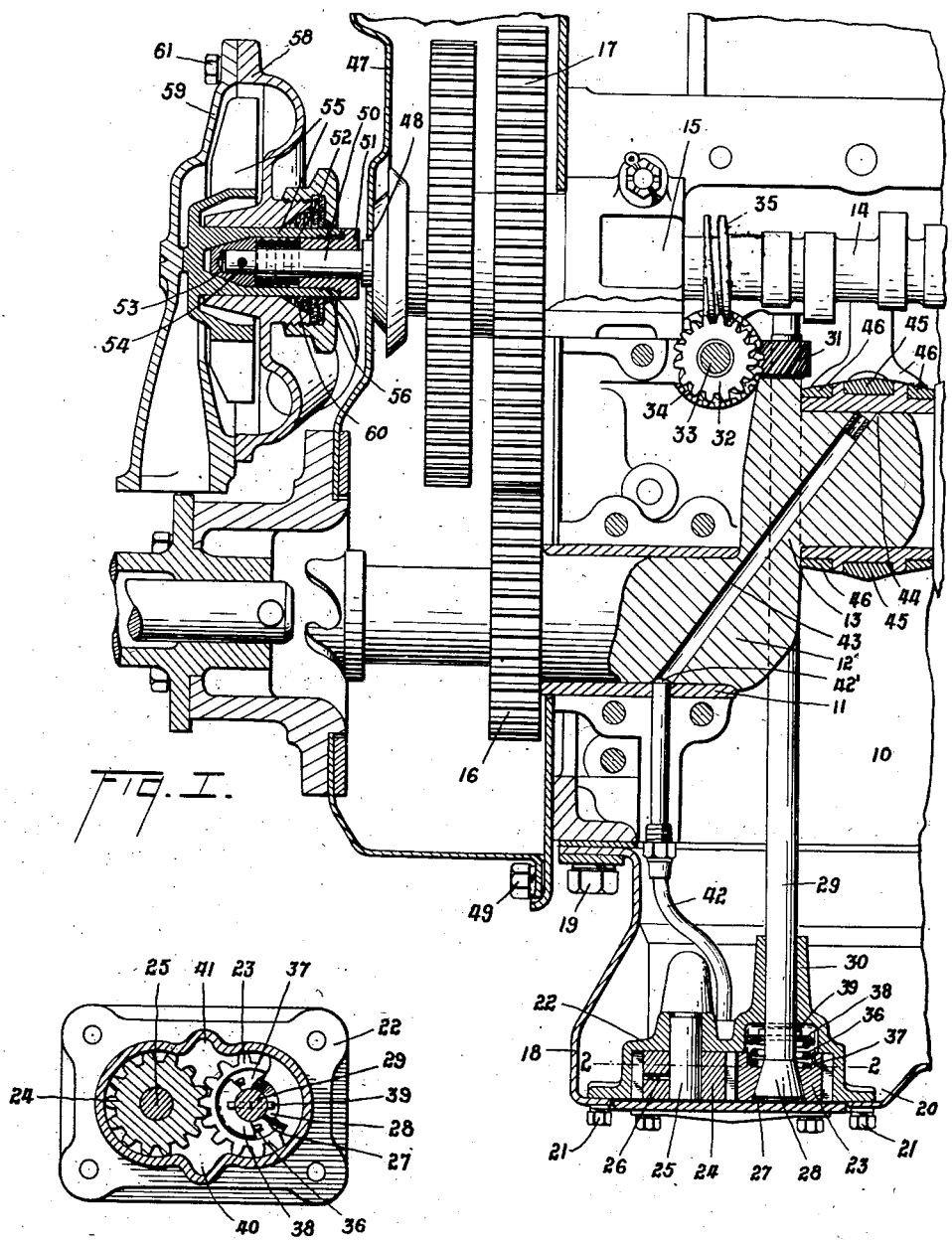
INVENTOR:
CHARLES R. SHORT,
BY
ATTORNEY.

UNITED STATES PATENT OFFICE.

CHARLES R. SHORT, OF DETROIT, MICHIGAN, ASSIGNOR TO GENERAL MOTORS COMPANY, OF DETROIT, MICHIGAN, A CORPORATION OF NEW JERSEY.

HYDROCARBON-MOTOR.

1,393,914.

Specification of Letters Patent.   Patented Oct. 18, 1921.

Application filed June 11, 1917.   Serial No. 174,170.

*To all whom it may concern:*

Be it known that I, CHARLES R. SHORT, a subject of the King of Great Britain, and resident of Detroit, Wayne county, State of Michigan, have invented certain new and useful Improvements in Hydrocarbon-Motors, of which the following is a specification.

This invention relates to hydrocarbon motors, and more particularly to improvements in drives for pumps and other liquid circulating devices therefor. Considerable difficulty has been experienced with the operation of internal combustion engines in cold weather on account of the fact that the oil or water in the circulating pumps has frozen, causing the pumps to stick. Under such conditions, when the engine and the pump driving connections are forcibly turned over as by a power driven starter, breakage has resulted.

To obviate this, and other difficulties, I have provided slip devices or automatically releasable connections between the engine and the liquid circulating devices which are adapted to disconnect these parts when the load placed upon the pumps by congealing of the liquid with a lowering in temperature, exceeds a pre-determined amount. I prefer to so form my connection that when there is any slippage, heat will be generated by friction which will be conducted to the liquid, thus raising its temperature, decreasing its density and relieving the load on the pumps so that the driving conditions again become normal.

These, and various other objects will more clearly appear from the following description, taken in connection with the accompanying drawings, which form a part of this specification and in which:

Figure 1 is a fragmentary vertical section of the forward end of a hydrocarbon motor, embodying preferred forms of my invention; and Fig. 2 is a horizontal section substantially on the line 2—2 of Fig. 1, illustrating an oil pump assembly.

Referring to the drawings, 10 is a crank case in which may be mounted in bearings 11, a crank shaft 12 provided with throws 13.

A cam shaft 14 may be mounted in suitable bearings 15 in the crank case, in parallel relation to the crank shaft, and these two shafts are connected in driving relation by intermeshing gears 16 and 17, secured to the forward end of the respective shafts.

A pan 18 is arranged across the bottom of the crank case and is secured in position as by bolts 19. The lower part of the pan is formed with an oil well 20 in which is mounted, as by bolts 21, an oil circulating pump of the so-called gear type and comprising a two part casing 22 in which are housed a pair of inter-meshing gears 23 and 24. The driven gear 24 is trunnioned on a shaft 25 in the upper member of the casing 22 and the gear 24 is formed with a lubricating channel 26 extending from its periphery to the surface of the shaft 25 for maintaining a film of lubricating oil between these relatively moving parts.

The gear 23 is formed interiorly with a frusto conical surface 27 in which is adapted to be introduced a similarly formed portion 28 of a shaft 29 which is mounted at its lower end in an outwardly extending boss 30 in the chamber 22 and with its upper end suitably supported in a bearing in the crank case 10. The upper end of the shaft 29 has a spiral gear 31 secured thereon in mesh with a similar gear 32 which is secured to a horizontally arranged shaft 33. This shaft is provided with another spiral driving gear 34 in mesh with and adapted to be driven from a gear 35 formed adjacent the front end of the cam shaft 14.

A spring 36 is adapted to be inserted between the upper side 37 of the gear 23 and a collar 38 which is sleeved on the shaft 29 and maintained against upward movement as by a pin 39. This spring, collar and retaining pin, it will thus be seen, forms a friction drive connection between the shaft 29 and the gear 23. In the event that the motor operates under temperature conditions low enough to congeal the oil, the spring 36 will automatically permit the gear 23 to slip relatively to the shaft when the load exceeds the predetermined factor of safety. This slippage will, of course, result in the generation of heat by friction, which will cause the adjacent parts and the lubricating oil to be heated up until conditions again become normal.

The lubricant is adapted to flow from the well 20 into the pump casing as at 40 and to be discharged as at 41, from which it will be conducted by a conduit 42 to a crank shaft main bearing 11, lubricating the same, and then a portion will be carried from this bearing to a registering port 42' formed in the crank shaft 13. From this point, the lubricating oil may be conducted as by a channel 43 to the crank pin 44 on which the lower ends 45 and 46 of a pair of connecting rods may be mounted.

A cover 47 having a front opening 48 is adapted to be arranged over the gearing at the front end of the crank and cam shafts 12 and 14 respectively and to be secured into position on the crank case as by bolts 49.

It will be noted that the cam shaft is provided with a contracted portion 50 which extends through the cover opening 48 exteriorly of the cover 47. A sleeve 51 and a spring 52 are adapted to be fitted on the cam shaft extension 50 with a frusto conical stud 53, secured to its extreme end as by a pin 54. The pump impeller 55 is adapted to be fitted over the sleeve 51 and to be adjustably secured thereto by threads 56 with its conical interior 57 in contact with the driving plug 53. It will be noted that this construction forms a yielding frictional driving connection between the cam shaft extension 50 and the impeller 55. The usual two part pump casing 58 and 59 with its packing gland 60 is mounted on the impeller with the parts secured into position as by bolts 61.

It will be understood that as the load on the water pump impeller 55 is caused to increase by freezing of the water under low temperature operating conditions, the friction drive connection will automatically permit a relative slippage between the driving plug 53 and the impeller 55 and the adjacent parts will heat up and function as described in connection with the oil pump.

While I have described my invention as particularly applied for improving the low temperature operating conditions of an internal combustion engine, it will be obvious that it will have many other uses and applications, and while I have described what I believe to be a preferred embodiment, it will be obvious to those skilled in the art, that various modifications and changes may be made without departing from the spirit and scope hereof.

While I have thus described my invention, what I desire and claim to secure by Letters Patent is:

1. In an internal combustion engine, the combination with a liquid circulating device comprising a rotating element or part, of means for driving the same comprising an automatic friction cone clutch, one member of which is carried by said rotating element.

2. In combination in an internal combustion engine having a liquid circulating system, a liquid impelling pump adapted to cause a flow of cooling liquid therethrough; and heating means associated with said pump for heating said cooling liquid when the temperature thereof falls to such a point that the character of said liquid is changed in such a way that the pump can no longer cause it to flow.

3. In combination in an internal combustion engine having a cooling liquid circulating system, a pump included in said system and adapted to cause a flow of cooling liquid to occur therethrough; a driving shaft for driving said pump, and which driving shaft is operatively connected with said pump through friction surfaces which may move in contact with one another; the location of said friction surfaces being such that the heat generated as they slip relative to one another is communicated to the liquid to thereby raise the temperature thereof.

4. The combination with an internal combustion engine, having a liquid circulating device therefor; means for driving said device from said engine and which driving means is adapted to slip when the liquid congeals and thus increases the load on the circulating device; and means whereby the heat resulting from the slipping of the driving connection aforesaid is conducted to the liquid to thereby heat the liquid, and decrease the load on the device.

5. In combination in an internal combustion engine, a liquid impelling pump having a rotating element or part in contact with and acting directly upon a liquid being pumped; a rotating driving shaft connected directly with said rotating element; and means intermediate said driving shaft and said rotating element and through which said element is driven, the character of said driving means being such that the driving action of said driving shaft will be interrupted if and when a reduction of temperature in the liquid operated upon changes the condition of said liquid in a manner such that the pump can no longer cause the said liquid to flow.

6. In combination in an internal combustion engine, a liquid impelling pump having a rotating element or part in contact with and acting directly upon the liquid being pumped; a rotating driving shaft operatively connected directly with said rotating element to drive the same; and means the operation of which is dependent upon increased resistance to flow incident to a reduction of temperature in the liquid operated upon by the pump for interrupting the pumping action of said pump under conditions of abnormally low temperature of the said liquid.

7. In combination in an internal combustion engine, a liquid impelling pump having a rotating element or part in contact with and acting directly upon the liquid being pumped; and a rotating driving shaft whereby said rotating element is carried and driven, and which shaft is operatively connected with said rotating element through a slip connection, so that said driving shaft may rotate without communicating motion to said rotating element if and when a reduction of temperature of the liquid operated upon changes the condition of said liquid in a manner such that the pump can no longer cause the same to flow.

8. In combination in an internal combustion engine, a liquid impelling pump having a rotating element or part in contact with and acting directly upon the liquid being pumped, and which element is provided with a friction surface; a rotating driving shaft having a friction surface in contact with the friction surface aforesaid of said rotating element; and a spring acting to force said friction surfaces in engagement with one another, the parts being so arranged and adjusted that the driving action through said friction surfaces will be interrupted upon a reduction of temperature of the liquid operated upon to an extent sufficient to change the condition of said liquid in such a way that said pump can no longer cause said liquid to flow.

9. In combination in an internal combustion engine, a liquid impelling pump having a casing provided with a bearing; a rotating liquid impelling element located within said casing and having a hollow tubular sleeve supported in said bearing; a driving shaft extending into said sleeve and having a friction surface in engagement with a coöperating friction surface provided within said sleeve; and a spring located within said sleeve and acting to force said friction surfaces into engagement with one another to thereby secure the driving of said rotating element or impeller from said driving shaft, the adjustment of the parts being such that said friction surfaces may slip to thereby interrupt the driving action of the driving shaft if and when a reduction of temperature brings about a change in the condition of the liquid operated upon of such a character that the pump can no longer cause said liquid to flow.

In testimony whereof I affix my signature.

CHARLES R. SHORT.